Patented Aug. 15, 1944

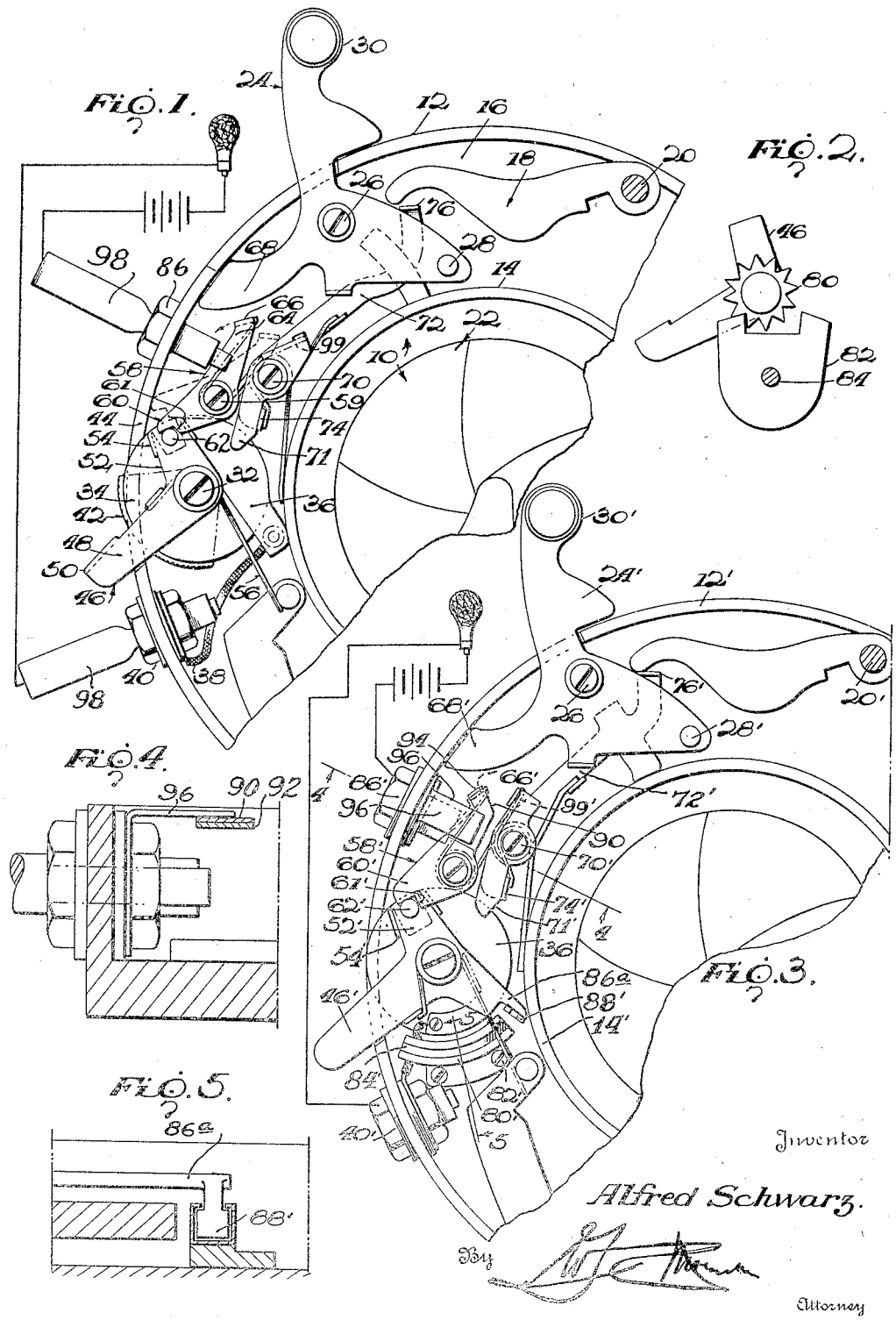

2,355,825

UNITED STATES PATENT OFFICE 2,355,825

PHOTOFLASH SYNCHRONIZING MECHANISM

Alfred Schwarz, Rochester, N. Y., assignor to Ilex Optical Company, Rochester, N. Y., a corporation of New York Application April 6, 1942, Serial No. 437,889

26 Claims. (Cl. 67—29)

The present invention relates to photoflash synchronizing mechanism of the type wherein an electrical circuit containing a flash bulb is closed for setting off a flash in synchronization with the opening of a camera shutter.

The invention is illustrated and described herein in connection with cameras having shutters of the Compur type but it will be distinctly understood that the principles of the invention are applicable to cameras having other types of shutters and in such instances suitable modification may be resorted to without departing from the spirit of the invention.

It is well known that there is a time lag of definite and calculable duration existing from the instant electrical contact is made in a flash bulb circuit to the peak of the flash in the flash bulb. This time lag is quite uniform in bulbs of the same rating and made by the same manufacturer. It is also recognized that in addition to the time lag of the flash bulb there is likewise a time lag in the movement of the shutter existing from the instant of its release until it reaches its fully open position. Such lag obviously is dependent upon mechanical considerations such as the motive force acting upon the shutter, its direction of application to the shutter blades proper, friction existing in the various pivot bearings of the shutter control levers and other devices, tension of the various springs that may be employed, etc. This latter time lag of the shutter movements is therefore not constant throughout the use of the camera and varies one way or the other as the various mechanical parts become worn or as the resiliency thereof deteriorates.

The present invention takes cognizance of these time lag phenomena and has as an object thereof the provision of a novel means for compensating for the difference in time lag between the maximum illumination of the flash bulb and the moment of maximum shutter opening so that these two time increments will occur simultaneously. According to the present invention, compensation for and synchronization of the shutter and flash bulb time lags may be made manually by a simple adjustment and once the adjustment is made, the setting will remain accurate for flash bulbs having the same electrical characteristics throughout a considerable period of time. If subsequently a flash bulb having a different electrical characteristic is employed, an adjustment may be made without disturbing or altering the adjustment of any of the shutter instrumentalities to compensate for the discrepancy offered by the new bulb.

The provision of adjustable photoflash synchronizing mechanism of the character set forth above being the principal object of the invention, it is another object to provide a mechanism of this type which is substantially enclosed in and concealed by the shutter casing or which, in other words, is built into the shutter casing and which does not require enlargement or modification of the same.

Another object of the invention is to provide a synchronizing mechanism of the built-in type which may be brought into cooperation with the shutter mechanism only when actual use thereof is intended and which, when its use is not required, may be placed in an inoperative position where it will neither retard nor otherwise interfere with the movements of the shutter mechanism proper.

A still further object of the invention is to provide a synchronizing device which is foolproof to the extent that means is provided whereby the shutter mechanism is required to be set for instantaneous operation before the synchronizing mechanism can be set for its operation. In other words, according to the present invention if the shutter mechanism is set for time exposures or for bulb exposures the synchronizing mechanism is incapable of being potentially set for operation.

Yet another object of the invention, in a modified form thereof, is to provide a synchronizing mechanism for closing an electrical circuit through a flash bulb at the precise moment of maximum shutter opening, the mechanism also having means associated therewith whereby after an exposure has been made and the circuit closed to discharge the flash bulb, the circuit automatically becomes opened and can not again be closed until the photographer knowingly sets the synchronizing mechanism for a future subsequent exposure operation.

Another object of the invention is to provide a synchronizing mechanism of the character set forth above having a stationary contact and a movable contact, the latter contact being normally held out of engagement with the stationary contact but movable into engagement therewith, together with a retarding mechanism for retarding such movement in order that the discrepancy between time elements required for proper synchronization of the flash and for the shutter opening may be compensated for.

The provision of a synchronizing mechanism which will insure extreme accuracy in synchronization between movements of the shutter and the flash bulb, one which is simple and reliable and which is comprised of a minimum number of moving parts and which therefore is unlikely to get out of order; one which may be manufactured economically; one in which the synchronizing mechanism is for most part enclosed entirely within the shutter casing and which therefore, is protected from moisture, dust, dirt, and the like, and one which requires no particular degree of skill for its operation, are further desirable features that have been borne in mind in the production and development of the present invention.

Other objects and advantages of the invention not at this time particularly enumerated will become more readily apparent as the nature of invention is better understood.

In the accompanying single sheet of drawings there have been disclosed two embodiments of the invention. In the drawing Fig. 1 is a detailed fragmentary plan view of an open shutter casing and shutter mechanism showing one form of the synchronizing mechanism embodying the present invention.

Fig. 2 is an enlarged detailed sectional plan view of a retarding mechanism employed in connection with the form of invention shown in Fig. 1.

Fig. 3 is a detailed plan view similar to Fig. 1 showing a slightly modified form of the invention.

Figure 4 is a sectional view taken substantially along the line 4—4 of Fig. 3, and Fig. 5 is a sectional view taken substantially along the line 5—5 of Fig. 3.

In all of the above described views similar characters of reference are employed to designate similar parts throughout.

Referring now to Fig. 1, the improved synchronizing mechanism is shown as being applied to a generally cylindrical ring-like shutter casing 10 having outer and inner cylindrical walls 12 and 14 respectively, and a rear wall 16. A lever 18 is pivoted as at 20 to the rear wall 16 and functions as a locking lever to lock the master lever (not shown) which controls opening and closing movements of the shutter blades 22 in a manner well known in the art. The master lever and its associated mechanism whereby the shutter is operated form no part of this invention and reference may be had to United States patent to Brueck No. 2,129,561, dated September 6, 1937, for a Shutter operating mechanism, for a full disclosure of a shutter control device capable of application to the present shutter. It is deemed sufficient to state that when the locking lever 18 is swung to a position of release with its end adjacent the outer wall 12 of the casing, the master lever (not shown) is released and moves inwardly at the casing in one direction and serves to cause opening and closing of the shutter blades 22. A trigger lever 24 is pivoted as at 26 to the rear wall 16 and is provided with a pin 28 adapted, when the synchronizing mechanism is not employed, to engage the lever 18 and move it to its position of release. The lever 24 is provided with a finger piece 30 whereby it may be actuated.

A bearing post 32 projects upwardly from the rear wall 16 and has mounted thereon for turning movement a disc 34 of insulating material to which there is secured to contact plate 36 which is connected by means of a flexible wire or lead 38 to a terminal or jack 40. The disc 34 is formed with a knurled portion 42 which projects through a slot 44 in the outer wall 12 of the shutter casing and by means of which the angular position of the contact plate 36 may be adjusted for a purpose that will become apparent presently.

Mounted for independent angular turning movement about the axis of the bearing post 32 is a contact lever 46 including an actuating arm 48 having a finger plate 50 thereon, and a contact arm 52 having a contact plate 54 secured thereto and designed for engagement with the contact plate 36. A spring 56 serves to normally urge the lever 46 in a clockwise direction to a position wherein the contact plate 54 overlies and engages the contact plate 36.

A latching lever 58 is pivoted as at 59 to the rear wall 16 of the sutter casing and is provided with an arm 60 having a latching detent 61 formed thereon and designed for latching engagement with a pin 62 provided on the contact arm 52 of the lever 46. The lever 58 is also provided with an arm 64 having a lug 66 thereon designed for engagement with an extension 68 formed on the trigger lever 24. It will be seen therefore that when the trigger lever 24 is actuated, the extension 68 thereof is adapted to engage the lug 66 of the lever 58 and move the detent portion 61 out of engagement with the pin 62 to release the lever 46 and allow the same to be moved by the action of the spring 56 to its contacting position.

A post 70 extends upwardly from the rear wall 16 and serves to limit the turning movement of the lever 58. When the lever 58 is in engagement with the post 70 as shown in dotted lines, the position of the lug 66 is such that the trigger lever 24 cannot be turned about its pivotal axis sufficiently to permit the pin 28 to release the locking lever 18. However, when the trigger lever 24 is released and returned to initial position as shown in Fig. 1, lever 58 is turned by its spring until its lug 66 lies against the cylindrical wall of the casing adjacent the jack 86, after which, if the synchronizing mechanism is not set, free and unobstructed movement of the trigger lever 24 is permitted and the lever 18 may be moved thereby to its position of release.

Pivotally mounted on the post 70 is a kick-out lever 72 having a lug 74 at one end against which is positioned a spring pressed pawl 71 pivotally mounted on the post 70 and projecting beyond the adjacent end of the kick-out lever 72 and constituting a yieldable extension thereof and located in the path of movement of the arm 52 of the lever 46. Pawl 71 is actuated in a counterclockwise direction on post 70 by means of a spring 99 bearing at one end against lug 74 on lever 72 and coiled about post 70, with its opposite end on the other side of the post bearing against the opposite end of pawl 71. The kick-out lever 72 is formed with a lug 76 at its other end and this latter lug 76 is arranged to engage the end of the lever 18 and move the lever to its position of release. The lever 58 is in engagement or contact with the post 70 only as long as it is pressed against said post 70 by the portion 68 of the trigger lever 24. Thus, the trigger lever 24 cannot be turned sufficiently to release the locking lever 18 after the synchronizing mechanism is set for operation, but, when the latching lever 58 is set for operation in the full line position illustrated in Figure 1, it is positioned for engagement by the trigger lever 24 to release lever 52 which is moved by its spring to engage pawl 71 on lever 72 and thus move lever 72 to move lever 18 to effect the exposure. In this full line position the latching lever 58 is in a set position ready to be turned by the extension 68 of the trigger lever 24. If the contact lever 46 is not set, that is, if the synchronizer is not used, the lug 66 of the latching lever 58 is carried out of the path of movement of the trigger lever 24, as explained above, and is located at the outer wall 12 of the casing in a corner between the said outer wall and an electric outlet 86. The latching lever 58 is spring actuated or urged in a counterclockwise direction by its actuating spring into its position of disengagement out of the path of movement of the trigger lever which is to be permitted free movements. The pawl 71 which constitutes an extension of the adjacent arm of the kick-out lever projects beyond the said lever into the path of the pin 62 of the contact arm 52 and it operates to move the kick-out lever through the lug 74 thereof. The pawl 71 which forms a yieldable extension of the said kick-out lever, in the particular form of the invention as illustrated in Figures 1 and 3 of the drawing, is adapted to permit the arm 52 of the contact lever 46 to swing past the kick-out lever in returning to the full line position illustrated in Figure 1 after an operation of the synchronized mechanism.

The contact lever 46 has associated therewith a suitable retarding mechanism for preventing too rapid turning movement thereof about its pivotal axis, and one form of a turning mechanism is shown in detail in Figure 2. This turning mechanism is of a type well known in the art for retarding camera shutter movements and consists of an escapement wheel 80 and a cooperating escapement plate 82 which is pivoted as at 84 to the rear wall 16. If desired any other suitable form of retarding mechanism such as that shown in Figure 3 and which will be described presently may be employed.

A grounded jack is shown at 86 and forms a contact with the shutter casing and is employed in combination with the ungrounded jack 40 for reception of a pair of contact plugs 98 which are connected in a suitable flash bulb circuit including a battery and bulb (not shown).

The operation of the apparatus is as follows:
With the parts assuming their disengaged positions, the synchronizing mechanism not being employed actuation of the trigger lever 24 causes the pin 26 to engage the lever 18 and move the same to its position of release, thus allowing the master lever (not shown) to move unchecked to its final position and thereby rendering an instantaneous operation of the shutter. In order to set the synchronizing mechanism for operation, it is merely necessary for the operator to engage the finger piece 50 of the lever 46 and move this latter lever in a counterclockwise direction in the drawing to its full line position. The pin 62 is thus engaged by the detent 61 and the various parts assume the positions shown in full lines. Subsequent actuation of the trigger lever 24 causes the extension 68 thereof to engage the lug 66 of the arm 64 and rock this lever in a clockwise direction. As soon as the detent 61 of the lever 58 releases the pin 62, the lever 46, under the influence of the spring 56, turns in a clockwise direction and the contact plate 54 passes over the contact plate 36 and comes to rest in engagement with the same, thus closing the electrical circuit through the flash bulb. Upon approaching its final position, the arm 52 of the lever 46 operates the lever 18 through the kick-out lever and its pawl 71 and moves the lever 18 to its position of release. The master lever (not shown) is thus released and the shutter mechanism is thereby actuated in the manner previously described. It will be noted that when the synchronizing mechanism is set for use, the trigger lever 24 merely trips the latching lever 58 so as to release lever 46 which, by its contact 54, closes the electric circuit through the flash bulb at a time dependent upon the adjustment of disk 34, after which lever 52 actuates the kick-out lever 72 and locking lever 18 to open and close the shutter. The operation is the same for the modification shown in Fig. 3, the shutter, in both modifications, being actuated through the adjustably timed synchronizing mechanism when the latter is employed.

It will be seen that by engaging the knurled portion 42 of the insulating disc 34 with the finger, the position of the plate 36 may be so adjusted that the peak of the flash will coincide with the full maximum open position of the shutter blades 22.

In Figs. 3, 4, and 5 a slightly modified form of the invention is shown wherein means are provided for preventing accidental discharge of a flash bulb if the latter is placed in the electrical circuit prior to resetting of the synchronizing mechanism. Also in this form of the invention the retarding mechanism employed is of a different type from that shown in Figs. 1 and 2. In the main, however, the various parts of the synchronizing mechanism remain substantially the same as the parts shown in Fig. 1 and Fig. 2 and accordingly similar characters of reference have been employed to designate the corresponding parts of the two modifications to avoid repetition of description.

In this latter form of the invention the electrical jack 86' is of the insulating type, i. e. it is not grounded to the shutter casing. The lever 58' is provided with a conductive plate 90 (see Fig. 4) which is insulated therefrom by means of an insulating strip 92. The plate 90 is bent over the lug 66' of the lever 58' as at 94 and is designed for electrical contact with the extension 68' of the trigger release lever 24'. A contact finger 96 extending from the jack 86' is in permanent sliding contact with the plate 90 and thus it will be seen that normally when the trigger release lever 24' is in its retracted position the two jacks 86' and 40' remain insulated from each other and the electric circuit through the flash bulb remains open. Therefore, a flash bulb may safely be connected in the circuit without danger of accidental discharge thereof. As soon as the trigger release member 24' is actuated, the extension 68' engages the bent over portion 94 of the plate 90 and immediately grounds the contact jack 86' to the shutter casing. From this point on, the operation of the apparatus is substantially the same as the operation of the apparatus shown in the Figs. 1 and 2.

The retarding mechanism employed in connection with this form of the invention consists of an arcuate tubular member 80' which is secured by means of screws 82' to the rear wall 16' of the shutter casing. The member 80' is provided with an elongated slot 84' adapted to be traversed by the free end of an arm 86ª informed on the lever 46'. The arm 86ª carries a retarding member 88' which enters the tubular member 80' and is retarded in its motion therethrough by means of air pressure. Obviously if a slower rate of movement for the lever 46' is desired one end of the tubular member 80' may be closed and suitably apertured to effect a dash-pot action. Various changes may be made in the above construction and many widely different embodiments of the invention may be resorted to without departing from the scope of the invention as defined in the accompanying claims. It is intended that all matter contained in the above description and shown in the accompanying drawing shall be regarded as illustrated and not in a limiting sense.

What is claimed is:

1. In a shutter mechanism of the set type, a shutter casing, a shutter locking lever movable to control shutter opening and closing movements, a trigger member for tripping said locking lever to effect said shutter movements, a stationary contact member mounted on the casing, a movable contact member, means normally urging the movable contact member into electrical engagement with the stationary contact member, a latching lever for holding the movable contact member out of engagement with the stationary contact member, said latching lever normally occupying a position out of the path of movement of the trigger member and having a portion thereof projecting into said path when in its latching position for movement by said trigger member to release said movable contact member, and a kick-out lever positioned in the path of movement of said movable contact member and adapted to be engaged and moved by the latter when released, said kick-out member having a part positioned, when engaged by the movable contact member to trip said shutter locking lever to effect said shutter movements.

2. In a shutter mechanism, a shutter casing, a shutter locking lever movable to control shutter opening and closing movements, a trigger member for tripping said locking lever to effect said shutter movements, a stationary contact member mounted on the casing, a movable contact member, spring means normally urging the movable contact member into electrical engagement with the stationary contact member, a latching lever having a detent portion engageable with the movable contact member for holding the latter out of engagement with the stationary contact member, said latching lever normally occupying a position out of the path of movement of the trigger member and having an arm projecting into said path when in its latching position, and a kick-out lever positioned in the path of movement of said movable contact member and adapted to be engaged and moved by the latter when released, said kick-out lever having an arm engageable with said locking lever for moving the latter to effect operation of the shutter when the kick-out lever is engaged by the movable contact member.

3. In a shutter mechanism of the set type, a shutter casing, a shutter locking lever movable to control shutter opening and closing movements, a trigger member for tripping said locking lever to effect said shutter movements, a stationary contact member mounted on the casing, a movable contact member, means normally urging the movable contact member into electrical engagement with the stationary contact member, a latching lever for holding the movable contact member out of the engagement with the stationary contact member, said latching lever normally occupying a position out of the path of movement of the trigger member and having a portion thereof projecting into said path when in its latching position, and a kick-out lever positioned in the path of movement of said movable contact member and adapted to be engaged and moved by the latter when released, said kick-out member having a part positioned, when engaged by the movable contact member to trip said shutter locking lever to effect said shutter movements and means for adjusting the position of the stationary contact member relative to the movable contact member.

4. In a shutter mechanism of the set type, a shutter locking lever movable to control shutter open and closing movements, a trigger member for tripping said locking lever to effect said shutter movements, a stationary contact member mounted on the casing, a movable contact member, means normally urging the movable contact member into electrical engagement with the stationary contact member, a latching lever for holding said movable contact member out of engagement with the stationary contact member, said latching lever normally occupying a position out of the path of movement of the trigger member and having a portion thereof projecting into said path when in its latching position for movement by said trigger member to release said contact member, means for retarding the free movement of the movable contact member, and a kick-out lever positioned in the path of movement of said movable contact member and adapted to be engaged and moved by the latter when released, said kick-out lever having a part positioned, when engaged by the movable contact member, to trip said shutter locking lever to effect said shutter movements.

5. In a shutter mechanism of the set type, a shutter casing, a shutter locking lever movable to control shutter opening and closing movements, a trigger member for tripping said shutter locking lever to effect said shutter movements, a stationary contact member mounted on the casing, a movable contact member, means normally urging the movable contact member into electrical engagement with the stationary contact member, a latching lever for holding said movable contact member out of engagement with the stationary contact member, said latching lever normally occupying a position out of the path of movement of the trigger member and having a portion thereof projecting into said path when in its latched position for movement by said trigger member to release said contact member, and means operable upon release of said movable contact member by said latching lever for tripping said shutter locking lever to effect said shutter movements.

6. In a shutter mechanism of the set type, a casing, a shutter locking lever therein movable to control shutter opening and closing movements, a trigger member for tripping said shutter locking lever to effect said shutter movements, a stationary contact member mounted on the casing, a movable contact member, means normally urging said movable contact member into electrical engagement with the stationary contact member, a latching lever for holding said movable contact member out of engagement with the stationary contact member, said latching lever normally occupying a position out of the path of movement of the trigger member and having a portion thereof projecting into said path when in its latching position for movement by said trigger member to release said contact member, a kick-out lever positioned in the path of movement of said movable contact member and adapted to be engaged by the latter when released, said kick-out lever having a part positioned, when engaged by the movable contact member, to trip said shutter locking lever to effect said shutter movements, an insulating jack mounted on the casing and electrically connected to said stationary contact member, a second jack mounted on and electrically connected to the casing, and means electrically connecting the movable contact and the casing.

7. The combination with a shutter mechanism of the set type including a casing, a shutter locking lever movable to control shutter opening and closing movements, and a trigger member for tripping said shutter locking lever to effect said shutter movements, of a stationary contact member mounted on the casing, a movable contact member mounted for rotary movement about an axis from a position out of engagement with the stationary contact member to a position of engagement therewith, a latching lever for holding said movable contact member out of engagement with said stationary contact member, said latching lever having a portion thereof positioned in the path of movement of the trigger member and adapted upon being engaged by the latter to release said movable contact member.

8. The combination with a shutter mechanism of the set type including a casing, a shutter locking lever movable to control shutter opening and closing movements, and a trigger member for tripping said shutter locking lever to effect said shutter movements, of an adjustable stationary contact member mounted on the casing, a movable contact member mounted for rotary movement about an axis from a position out of engagement with the stationary contact member to a position of engagement therewith, a latching lever for holding said movable contact member out of engagement with said stationary contact member, said latching lever having a portion thereof positioned in the path of movement of the trigger member and adapted upon being engaged by the latter to release said movable contact member, and means for adjusting the position of said stationary contact member relative to the movable contact member.

9. In combination, a shutter casing, shutter control mechanism of the set type disposed within said casing including a shutter locking lever movable to control shutter opening and closing movements, a trigger release member for tripping said shutter release lever to effect said shutter movements, a stationary contact member mounted on the casing, a movable contact member mounted for rotary movement about an axis from a position out of an engagement with the stationary contact member to a position of engagement therewith, a latching lever for holding said movable contact member out of engagement with said stationary contact member, said latching lever having a portion thereof positioned in the path of movement of the trigger member and adapted upon being engaged by the latter to release said movable contact member, a contact jack mounted on and electrically connected to the casing, a second contact jack mounted on and insulated from the casing, and means electrically connecting said insulated contact jack and said stationary contact member.

10. In combination, a shutter casing, shutter control mechanism of the set type disposed within said casing including a shutter locking lever movable to control shutter opening and closing movements, a trigger member for tripping said shutter locking lever to effect shutter movements, a stationary contact member mounted on the casing, a movable contact member mounted for rotary movement about an axis from a position out of an engagement with the stationary contact member to a position of engagement therewith, a latching lever for holding said movable contact member out of engagement with said stationary contact member, said latching lever having a portion thereof positioned in the path of movement of the trigger release member and adapted upon being engaged by the latter to release said movable contact member, a contact jack mounted on and insulated from the casing and electrically connected with the stationary contact member, a second contact jack mounted and insulated from the casing and means operated by the trigger member for grounding said second contact jack to the casing.

11. A photoflash synchronizer mechanism for a photographic shutter of the set type having a shutter casing, means in said casing for locking the shutter in set position, and a trigger in said casing for releasing said locking means independently of said synchronizer mechanism to effect opening and closing movements of the shutter, said synchronizer mechanism comprising an electrical circuit including a pair of contacts having a relative movement into and out of engagement with each other, means in said casing adjustable to and from position for establishing a connection between said shutter trigger and said synchronizer mechanism for effecting engaging movement of said contacts to energize said photoflash circuit, and a connection between said synchronizer mechanism and shutter locking means, actuated by said movement of said contacts for releasing said locking means.

12. A photoflash synchronizer mechanism for a photographic shutter of the set type having a shutter casing, means in said casing for locking the shutter in set position, and a trigger in said casing for releasing said locking means independently of said synchronizer mechanism to effect opening and closing movements of the shutter, said synchronizer mechanism comprising an electrical circuit including a pair of contacts having a relative movement into and out of engagement with each other, means in said casing adjustable into and out of the path of operation of said shutter trigger for engagement and actuation thereby when in said path, for effecting said movement of said contacts to energize said photoflash circuit, and a connection with said shutter locking means, actuated by said synchronizer mechanism, upon said movement of said contacts, for releasing said locking means.

13. A photoflash synchronizer mechanism for a photographic shutter of the set type having a shutter casing, means in said casing for locking the shutter in set position, and a trigger in said casing for releasing said locking means independently of said synchronizer mechanism to effect opening and closing movements of the shutter, said synchronizer mechanism comprising a stationary contact adjustably mounted in said casing, indicating means movably mounted on said casing and accessible from the exterior thereof for adjusting the position of said stationary contact, a contact movable in said casing into and out of engagement with said stationary contact, and means in said casing adjustable selectively to and from position for establishing a connection between said shutter trigger and said mechanism for effecting movement of said movable contact into engagement with said stationary contact to energize said photoflash circuit.

14. A photoflash synchronizer mechanism for a photographic shutter of the set type having a shutter casing, means in said casing for locking the shutter in set position, and a trigger in said casing for releasing said locking means to effect opening and closing movements of the shutter, said synchronizer mechanism having an electrical circuit, a member of insulating material mounted for adjustment about a pivot in said casing and having a contact included in said circuit, indicating means movably mounted on said casing and accessible from the exterior thereof for pivotally adjusting the position of said member, a contact mounted for movement into and out of engagement with said stationary contact about a pivot located in said casing eccentrically of the shutter axis, spring means for moving said movable contact in one direction, and a connection in said casing with said shutter trigger for moving said movable contact in the other direction.

15. In a photographic shutter of the set type, the combination of a shutter casing, means in said casing for locking the shutter in set position, a spring-actuated photoflash synchronizer mechanism in said casing, means for setting said synchronizer mechanism independently of said shutter, means for operating said synchronizer mechanism adjustable to operating position by the setting of said mechanism, and a common trigger for actuating said operating means when said synchronizer mechanism is in set position, and for actuating said shutter mechanism when said synchronizer mechanism is in unset position.

16. A photoflash synchronizer mechanism for a photographic shutter of the set type having a shutter casing, means in said casing for locking the shutter in set position, and a trigger in said casing for releasing said locking means to effect opening and closing movements of the shutter, said synchronizer mechanism comprising spring actuating means, means for tensioning said spring means and setting said synchronizer mechanism for operation, an electrical circuit including a pair of contacts having a relative movement into and out of engagement with each other, and means in said casing operated by the setting of said synchronizer mechanism for establishing a connection between said shutter trigger and said synchronizer mechanism for effecting engaging movement of said contacts to energize said photoflash circuit.

17. A photoflash synchronizer mechanism for a photographic shutter of the set type having a shutter casing, means in said casing for locking the shutter in set position, and a trigger in said casing for releasing said locking means to effect opening and closing movements of the shutter, said synchronizer mechanism comprising spring actuating means, means for tensioning said spring means and setting said synchronizer mechanism for operation, an electrical circuit including a pair of contacts having a relative movement into and out of engagement with each other, means in said casing operated by the setting of said synchronizer mechanism for establishing a connection between said shutter trigger and said mechanism for effecting engaging movement of said contacts to energize said circuit, and a connection with said shutter locking means, actuated by said synchronizer mechanism, upon movement of said contacts, for releasing said locking means.

18. A photoflash synchronizer mechanism for a photographic shutter of the set type having a shutter casing, means in said casing for locking the shutter in set position, and a trigger in said casing for releasing said locking means independently of said synchronizer mechanism to effect opening and closing movements of the shutter, said synchronizer mechanism being constructed as a unit separately from said shutter and built into said casing for connection with and operation between said trigger and locking means and comprising spring actuated means, means for tensioning said spring means and setting said synchronizer mechanism independently of said shutter, an electrical circuit including a pair of contacts having a relative movement into and out of engagement with each other, means in said casing operated by the setting of said mechanism for establishing a connection between said trigger and said mechanism for effecting engaging movement of said contacts, and a connection with said shutter locking means actuated by said synchronizer mechanism upon movement of said contacts, for releasing said locking means.

19. In a camera shutter mechanism having a casing enclosing said mechanism, a member operable to effect the opening and closing of the shutter blades and a trigger movable to operate said member, a flashlight synchronizer device constructed independently of said shutter mechanism and enclosed within said casing, said synchronizer device comprising a flashlight circuit including a pair of contacts, spring means for effecting relative movement of said contacts into engagement with each other, latch means for restraining said engaging movement of said contacts and having a portion lying in the path of movement of said trigger for actuation thereby for tripping said latch means to effect said relative movement of said contacts, and a part actuated by said relative movement of said contacts for subsequently operating said shutter member to effect synchronous opening and closing of said blades.

20. In a camera shutter mechanism having a casing enclosing said mechanism, a member operable to effect the opening and closing of the shutter blades and a trigger movable to operate said member, a flashlight synchronizer device enclosed within said casing and comprising a flashlight circuit including a pair of contacts, spring means for effecting relative movement of said contacts into engagement with each other, latch means movable to set position for restraining said engaging movement of said contacts, said latch means normally lying out of the path of movement of said shutter trigger but lying in said path when moved to set position for actuation by said trigger and for obstructing movement of said trigger to operate said member, and a part actuated by said relative movement of said contacts for subsequently operating said member to effect synchronous opening and closing of said blades.

21. In a camera shutter mechanism, a casing for said mechanism, a shutter operating member movable from an initial position to a final position and operating during movement to cause the opening and closing of the shutter blades, a trigger for effecting movement of said member to final position, a stationary contact mounted within and insulated from said casing, a movable contact in said casing, means normally urging said movable contact into electrical engagement with said stationary contact, a latching lever for holding said movable contact out of engagement with said stationary contact, said latching lever normally occupying a position out of the path of movement of said trigger and having a portion thereof projecting into said path when in its latching position, and an actuating lever positioned in the path of movement of said movable contact and adapted to be engaged and moved thereby when said contact is released by said latching lever, said actuating lever being operable when engaged by said movable contact to actuate said member to final position.

22. In a camera shutter mechanism having a casing for said mechanism, a member operable to effect the opening and closing of the shutter blades, and a trigger for normally actuating said member, a flashlight synchronizer mechanism in said casing comprising a flashlight circuit including contacts for operating the same, means for connection with said trigger for causing said trigger to actuate said synchronizer mechanism, and means for connection with said synchronizer mechanism for causing said synchronizer mechanism to actuate said member for opening and closing the shutter blades.

23. In a camera shutter mechanism having a casing for said mechanism, a member operable to effect the opening and closing of the shutter blades, and a trigger normally actuating said member, a flashlight synchronizer mechanism in said casing comprising a flashlight circuit including contacts for operating the same, means normally lying out of the path of movement of said trigger but movable into said path for actuation by said trigger to actuate said synchronizer mechanism and to obstruct the normal actuation of said member by said trigger, and means for connecting said synchronizer mechanism with said member for actuating the same to open and close the shutter blades.

24. In a camera shutter mechanism having a member operable to effect the opening and closing of the shutter blades and a trigger movable to operate said member, a flashlight synchronizer comprising a flashlight circuit including a pair of timing contacts, means for effecting relative movement of said contacts into engagement with each other, latch means movable to set position for restraining said engaging movement of said timing contacts, means for tripping said latch means to effect said relative movement of said timing contacts, a pair of switch contacts having a relative movement into and out of engagement with each other, means controlled by the movements of both said latch means and said trigger for effecting said engaging movement of said switch contacts, and a part actuated by said relative movement of said timing contacts for operating said member to effect synchronous opening and closing of said blades.

25. In a camera shutter mechanism having a member operable to effect opening and closing of the shutter blades and a trigger for operating said member, a flashlight synchronizer mechanism comprising a flashlight circuit including a timing switch and a safety switch, spring means for operating said timing switch, setting means for said spring means arranged for actuation by said trigger, said safety switch having connections with both said trigger and switch setting means and being controlled by each thereof, and a part operated by the actuation of said switch setting means for subsequently operating said member to effect synchronous opening and closing of said blades.

26. A photoflash synchronizer mechanism for a photographic shutter of the set type provided with means for locking the shutter in set position and a trigger for releasing said locking means independently of said synchronizer mechanism to effect opening and closing movements of the shutter, said synchronizer mechanism comprising an electrical circuit including a timing switch and a safety switch, spring means for operating said timing switch, setting means having a latch for holding said timing switch open and arranged by the setting of said latch for actuation by said trigger, said safety switch having connections with both said trigger and switch setting means for joint control thereby, and a part actuated by the actuation of said switch setting means for subsequently operating said shutter locking means to effect synchronous opening and closing of said shutter.

ALFRED SCHWARZ.